Jan. 7, 1969            H. J. REINKE            3,421,063
RECTIFIER AND CONTROLLER INCLUDING TRIAC SWITCH
Filed Nov. 22, 1967
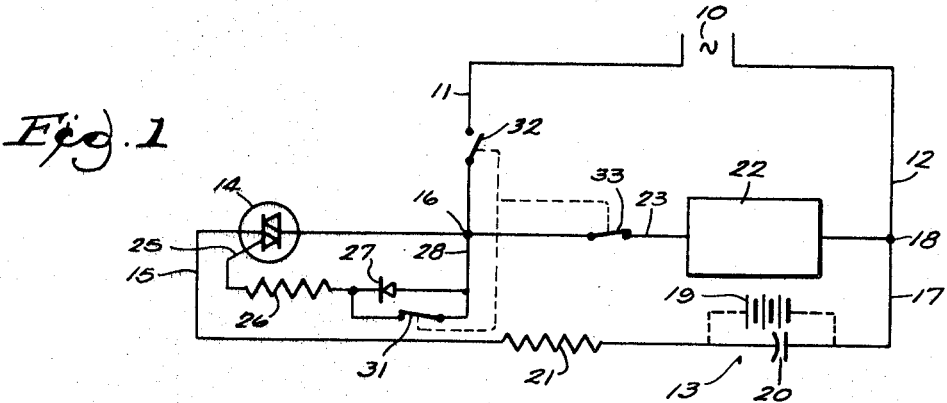
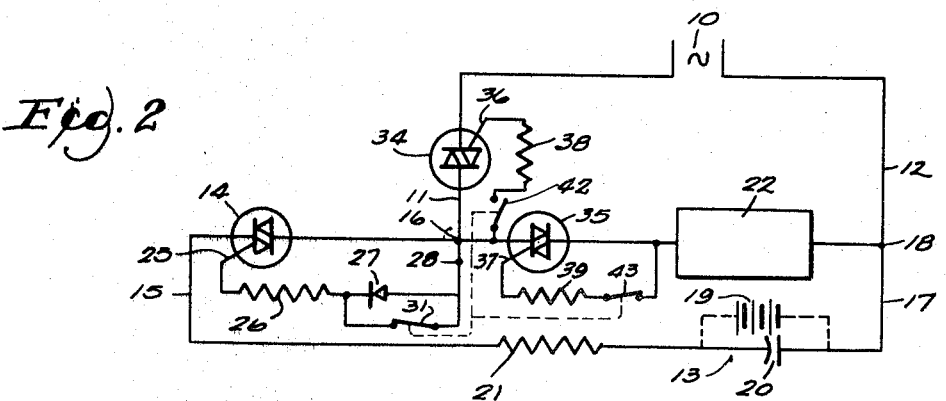
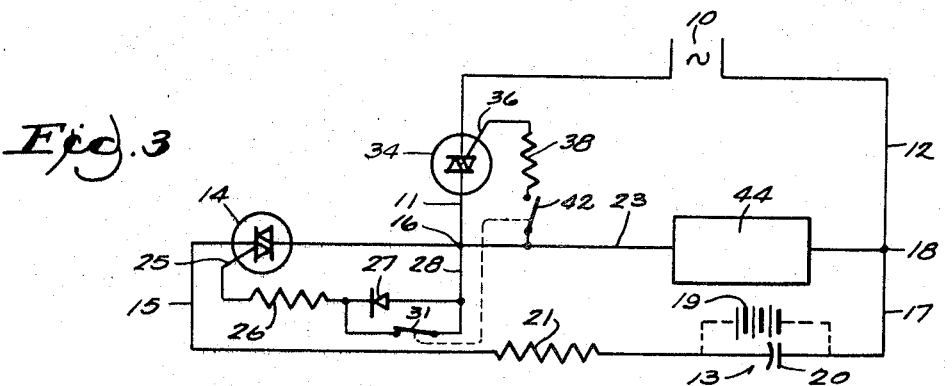
INVENTOR
HERBERT J. REINKE
BY Wheeler, Wheeler, House & Clemency
ATTORNEYS

INVENTOR
HERBERT J. REINKE

BY Wheeler, Wheeler, House & Clemency
ATTORNEYS

INVENTOR
HERBERT J. REINKE

United States Patent Office 3,421,063
Patented Jan. 7, 1969

3,421,063
RECTIFIER AND CONTROLLER INCLUDING TRIAC SWITCH
Herbert J. Reinke, 2220 S. 82nd St., Milwaukee, Wis. 53219
Continuation-in-part of application Ser. No. 503,844, Oct. 23, 1965. This application Nov. 22, 1967, Ser. No. 685,130
U.S. Cl. 318—203                         27 Claims
Int. Cl. H02p 1/40

ABSTRACT OF THE DISCLOSURE

This disclosure relates to apparatus for rectifying AC to DC and for controlling the imposition of DC on a load. The rectifier includes a triac and switching means for selectively connecting the rectifier to the AC to charge a DC power storage element and to the load to impose its charge on the load. The apparatus is advantageously used to dynamically brake an AC electric motor.

Cross reference to related application

This application is a continuation-in-part of my copending U.S. Patent application Ser. No. 503,844, filed Oct. 23, 1965, now abandoned.

Summary of the invention

The triac semi-conductor switch is a relatively recent development. Heretofore, it has been used to control AC power. In accordance with the present invention, the Triac has been adapted to control DC power in apparatus which sequentially rectifies AC to DC, stores the DC and then releases the DC into a load. In the apparatus of the present invention, the Triac performs both the rectifying and control functions.

The Triac is particularly advantageous for the purposes herein disclosed because substantial amounts of power can be handled without arcing. This advantage is particularly significant in applications where large numbers of switching steps are performed and where arcing would soon produce switch wear and generate maintenance problems. Moreover the Triac makes possible greatly simplified circuitry, as compared to comparable circuits for which semi-conductor switches could be devised.

Other objects, features and advantages of the invention will appear from the following disclosure.

Detailed description of the drawings

FIG. 1 is a circuit diagram illustrating a simplified form of the present invention for rectifying and controlling the imposition of direct current on a load.

FIG. 2 is a circuit diagram showing a somewhat more refined circuit similar to that of FIG. 1, but in which the Triac semiconductor switches are used to control the flow of current at all switch points where arcing might occur.

FIG. 3 is a circuit diagram showing the use of Triacs in a rectifying and control circuit where the load selectively consumes AC and DC power.

Detailed description of the preferred embodiments

Figure 4:
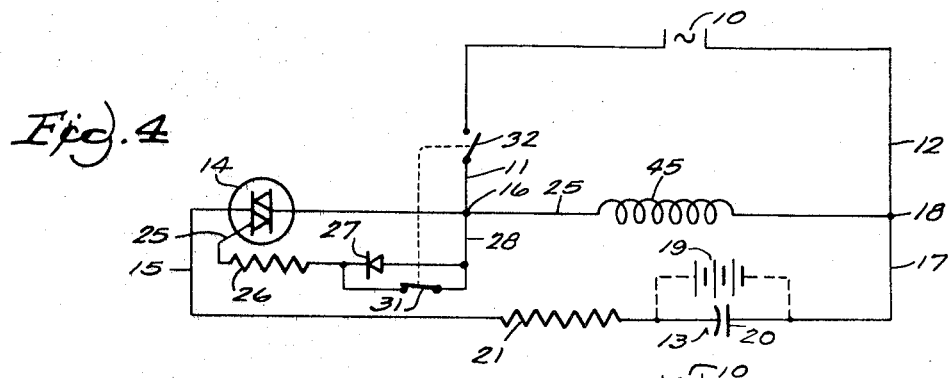
FIG. 4 is a simplified circuit diagram showing the use of a single Triac in a circuit to selectively supply the motor winding of an alternating current motor with alternating current for running and with direct current for dynamic braking.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Like parts are given the same reference characters in the several views.

Referring first to FIG. 1, an alternating current source 10 feeds AC power lines 11, 12. Connected to the AC circuit at terminals 16, 18 is a rectifying circuit comprising lines 15, 17, Triac 14, a DC power storage element 13, and a current limiting resistor 21.

The DC power storage element 13 may consist of a capacitor 20 or a battery 19. A DC load 22 may be connected by lines 23, 24 between terminals 16, 18.

Triac 14 typically consists of two silicon controlled rectifiers connected back-to-back in a common assembly and having a gate element 25. It may also consist of a network of separate, but paired, SCR's connected back-to-back with a comparable gate, or to a network consisting of an SCR paired with a diode and connected back-to-back with the gate of the SCR functioning as the gate of the network. In the art, "triac" is a generic term for a triode AC semi-conductor switch which is triggered into conduction by a gate signal in the manner similar to the action of an SCR. This component is also referred to in the art as a silicon gated symmetrical switch, or a bi-directional triode switch.

As used in this specification and claims, the term "triac" is meant to apply to the triac component or network aforesaid, and all equivalents thereof.

The gate 25 of the triac is energized through resistor 26 connected to one side of a diode 27, the other side of which is connected to terminal 16 through line 28. Switch 31 is connected across diode 27.

It is characteristic of the triac that when switch 31 is closed, thus to bypass diode 27 and impose signaling voltage on the gate 25, the triac will conduct in both directions. In effect, the triac functions in this mode as a conductor wire. When the switch 31 is open so that the diode 27 is in the gate circuit, the triac functions as a half-wave rectifier. If the triac gate circuit is completely de-energized, the triac acts as an open switch and will not pass current in either direction.

The FIG. 1 circuit further includes a switch 32 in line 11 and a switch 33 in line 23. Respective switches 31, 32, 33 are interconnected for concurrent operation, as indicated by the broken lines. As shown in this figure, switch 32 is open when switches 31 and 33 are closed. Alternately, switch 32 is closed when switches 31, 33 are open.

The operation of the circuit of FIG. 1 is as follows. With switch 32 closed and switches 31, 33 open, the load 22 is disconnected from the AC power source. The rectifying circuit including triac 14 is connected to the AC power circuit, and triac 14 functions as a half-wave rectifier to rectify the AC power and charge up the DC power storage element 13.

When it is desired to impose DC power on the load 22, switch 32 is open and switches 31, 33 are concurrently closed. Triac 14 now functions as a conductor wire, and the DC power storage element 13 will discharge through triac 14 to impose DC power on the load 22. If the DC power storage element 13 is capacitor 20, the time duration during which the load 22 is subject to DC power will be quite short, depending upon the discharge rate of the capacitor. If the element 13 is the battery 19, the DC power will be imposed upon the load 22 for a much longer period, depending upon the discharge rate of the battery 19.

The circuit of FIG. 2 is very similar to the circuit of FIG. 1, except that switches 32 and 33 have respectively been replaced by triacs 34, 35. The respective triacs have gates 36, 37 respectively connected by resistors 38, 39 to switches 42, 43. In this embodiment, switches 31, 42, 43 are interconnected for concurrent operation, as indicated in broken lines. The operation is the same as in the circuit of FIG. 1, except that the triacs 34, 35 perform the switching functions previously performed by switches 32, 33 of FIG. 1. Where any substantial current is carried in the lines 11, 23, this eliminates arcing. When either of switches 42, 43 is open, its triac 34, 35 is deenergized and functions as an open switch. When either of switches 42, 43 is closed, its triac 43, 35 conducts in both directions and functions as a conductor wire. In all other respects, the circuit of FIG. 2 functions in the same way as the circuit in FIG. 1.

The circuit of FIG. 3 illustrates a situation in which the load 44 has a selective demand for both AC and DC power. In this circuit there is no switch either of the open contact type or triac in the line 23 connected between terminal 16 and the load 44. Accordingly, when switch 42 is closed, so that triac 34 conducts in both directions, AC power will be imposed upon the load 44. By reason of the interconnection of switches 42 and 31, switch 31 will concurrently be open. Accordingly, diode 27 is in the circuit to the gate 25 of the triac 14 so that the triac 14 functions as a half-wave rectifier to charge the DC power storage element 13.

When switch 42 is opened, as indicated in FIG. 3, this will de-energize the gate 36 of triac 34 so that it will function as an open switch. This disconnects AC power from the load 44. Concurrently, switch 31 is closed to energize gate 25 of triac 14 so that triac 14 functions as a conductor wire, and hence discharges the DC power storage element 13 through the triac 14 into the load 44. Accordingly, concurrent actuation of the switches 31, 42, as aforestated, will selectively impose AC or DC power on the load 44. As suggested in FIG. 1, triac 34 and its gate circuit components could be replaced simply by a switch, such as switch 32 of FIG. 1, if current flow in line 11 is small enough to present no arcing problem.

FIG. 4 illustrates a very simple form of circuit involving the components aforesaid to selectively impose AC or DC power on the motor winding 45 of an AC motor. When switch 32 is closed and switch 31 open, winding 45 receives AC power and DC storage element 13 is charged through triac 14. When switch 32 is open and switch 31 is closed, DC storage element 13 discharges through triac 14 into winding 45, thus to dynamically brake the motor. This circuit has a high utility for the alternate energization and braking of the conventional AC shaded pole motor of program controllers of the type shown in U.S. Patent 3,101,435. In such a program controller, the programming drum must be instantly started and instantly stopped repeatedly millions of times during the life of the controller. It is highly desirable that switch arcing be eliminated, thus to reduce maintenance and increase the life of the components. The apparatus herein disclosed is admirably suited for this purpose.

Figure 5:
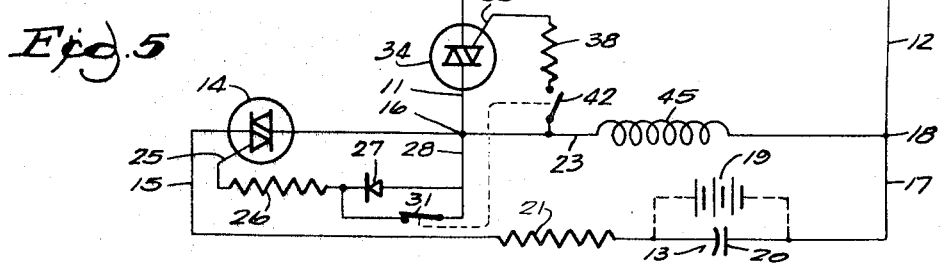
FIG. 5 is a circuit diagram of a further refined modification of the circuit of FIG. 4 in which another Triac is incorporated to provide for arcless switching wherever substantial current flow occurs in the circuit.

FIG. 5 is a further development of the circuitry of FIG. 4 in which the switch 32 of FIG. 4 is replaced by triac 34 and its gate circuit components, as is also shown in FIGS. 2 and 3. Accordingly, in the circuit of FIG. 5, triacs are used wherever switch arcing problems could occur.

Figure 6:
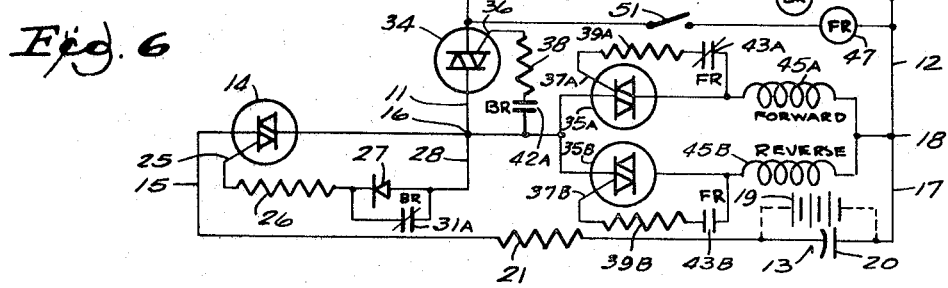
FIG. 6 is a simplified circuit diagram showing the use of the present invention as applied to a motor having forward and reverse windings, and in which alternating current is selectively supplied to one or the other windings for running the motor in either direction, and alternatively direct current is supplied to one or another of said windings for the dynamic braking of the motor.

FIG. 6 illustrates a situation in which a program controller, such as that shown in U.S. Patent 3,101,435, is to be operated selectively in both the forward and the reverse directions, and is to be dynamically braked while running in either direction. Reference characters applied to the components of this circuit are similar to those applied to the previous circuits to indicate a general correlation of the components of the previously described circuits, but in certain instances the numerals have subletters applied thereto to indicate specific differences.

The rectifier circuit comprising triac 14 and a DC power storage element 13, such as capacitor 20, and auxiliary components similar to that previously described, except that the switch 31 which bypasses diode 27 in the gate circuit of the triac 14 is identified as a normally closed contactor 31A which is responsive to a braking relay 46 across the AC power lines 11, 12 under control of switch 50.

This circuit is provided with a triac 34 similar to those previously described. The gate 36 of triac 34 has a normally open contactor 42A which is also responsive to the braking relay 46.

In this instance, the load consists of forward motor winding 45A and reverse motor winding 45B. These windings are respectively in series with triac switches comparable to triac switch 35 of FIG. 2. Forward winding 45A is in series with triac 35A having a gate 37A connected to resistor 39A and a normally closed contactor 43A subject to the forward-reverse relay 47. Relay 47 is across the AC power lines 11, 12 and is in series with reverse switch 51.

Reverse winding 45B is in series with triac 35B which has a gate 37B connected to resistor 39B controlled by normally open contactor 43B which is also governed by the forward-reverse relay 47. When the stepping switch 50 is closed to energize relay 46, this will close contactor 42A and open contactor 31A. With reverse switch 51 open, only forward winding 45A is subject to imposition of AC power during the running cycle of the motor. Triac 34 conducts in both directions by reason of the energization of its gate 36 through contactor 42A which is now closed by reason of the energization of relay 46. In this mode of operation, the rectifying circuit to DC power storage element 13 is energized because contactor 31A in the gate circuit of triac 14 is now open and triac 14 works as a half wave rectifier as aforestated.

To impose DC dynamic braking power from the DC power storage element 13 on the forward winding 45A, switch 50 in the braking circuit is opened to de-energize the braking relay 46. This will open switch 42A in the gate circuit to triac 34 to cause triac 34 to function as an open switch and remove AC power from the forward winding 45A. Concurrently, contactor 31A in the gate circuit of triac 14 will close to bypass diode 27 and cause the triac 14 to act as a conductor wire, whereupon the DC power storage element 13 will discharge through the triac 14 and impose DC power on the forward winding 45A to dynamically brake the motor.

For reverse operation of the motor, reverse switch 51 will be closed to energize forward-reverse relay 47, whereupon the contactor 43A will open to open the circuit to forward winding 45A, and contactor 43B will close to close the circuit to reverse winding 45A, subject to dynamic braking control pursuant to actuation of the switch 50 as aforesaid. In a program controller, such as shown in U.S. Patent 3,101,435, the braking switch 50 of FIG. 6 would be subject to program control stepping apparatus to selectively close and open switch 50 to alternately energize and apply dynamic braking power to the motor.

Figure 7:
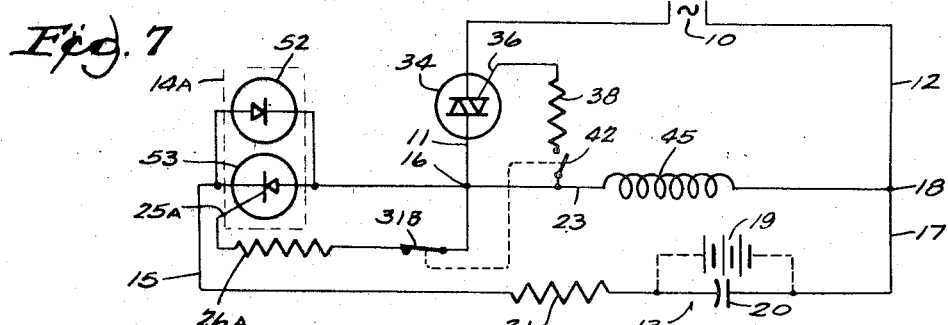
FIG. 7 is a simplified circuit diagram showing a different form of "Triac" in the rectifying circuit of the apparatus.

FIG. 7 shows a triac network 14A comprising a diode 52 and an SCR 53 connected back-to-back with the gate 25A of the SCR 53 functioning as the gate of the triac 14A. This figure is otherwise comparable to FIG. 5 herein. Switch 42 in the gate circuit of triac 34 is interconnected as indicated in broken lines with switch 31B in the gate circuit of the triac 14A. The gate 25A for the network is the gate of SCR 53. The gate circuit also includes resistor 26A, but omits a diode such as diode 27 of FIG. 5 as this is unnecessary in this circuit.

When switch 42 is closed and switch 31B is open, triac 34 conducts to furnish AC to winding 45. Concurrently, diode 52 of triac 14A rectifies the AC to charge capacitor 20 or battery 19. SCR 53 is inactive as its gate circuit is open.

When switch 42 is open and switch 31B is closed, triac 34 is inactive, but SCR 53 in triac 14A conducts to discharge the DC storage element 13 into winding 45 for dynamic braking of the motor.

Figure 8:
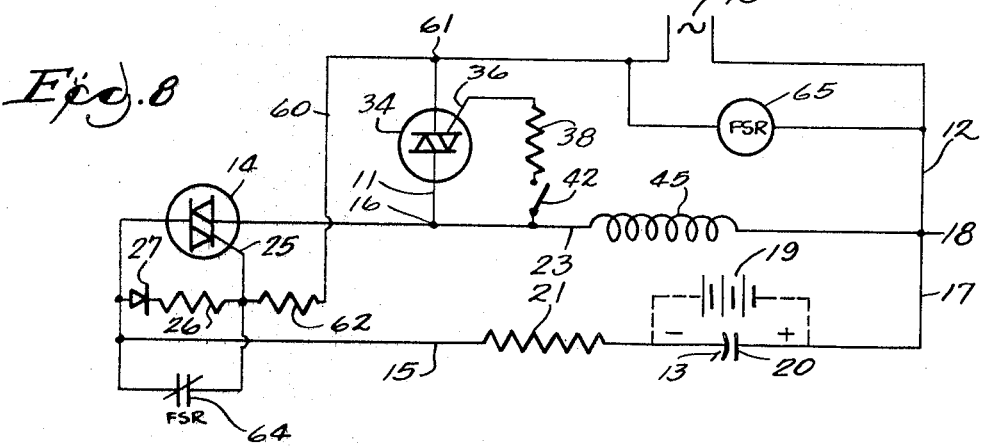
FIG. 8 is a circuit diagram similar to FIG. 5 but showing a modified form of switching means for controlling the Triac.
Figure 9:
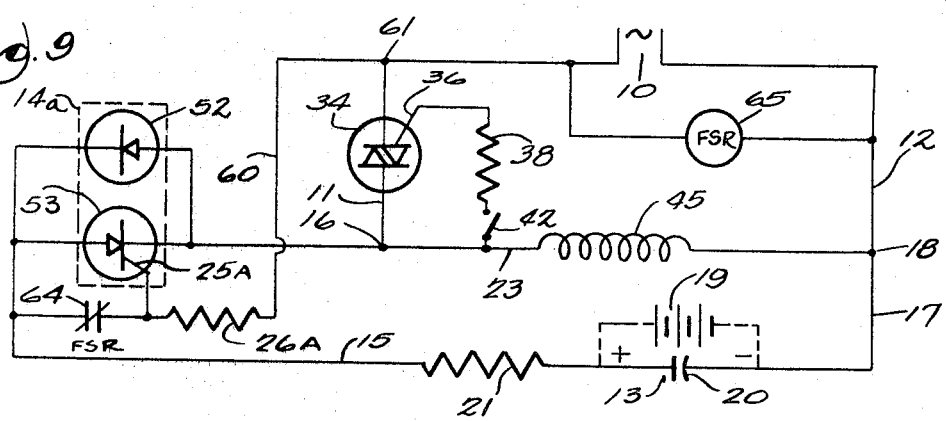
FIG. 9 is a circuit diagram similar to FIG. 7 but showing a modified form of switching means for controlling the triac.
Figure 10:
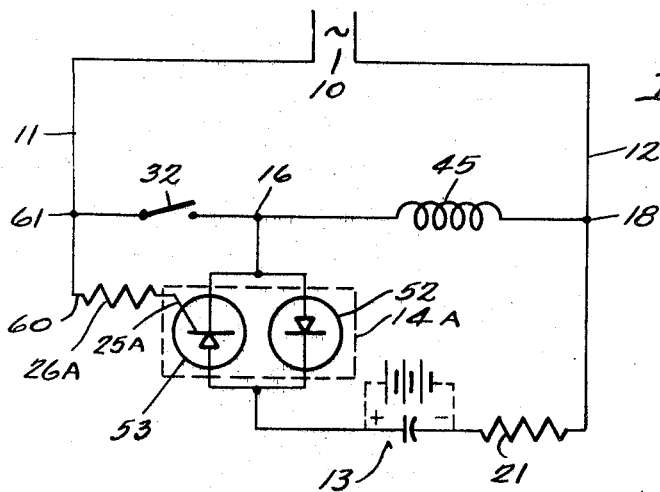
FIG. 10 is a circuit diagram showing a still further modified embodiment of the invention.

FIGS. 8, 9 and 10 show modifications to simplify the switching mechanism and to change the source of trigger voltage for the gate of the triac. These figures represent modifications of the circuits shown in FIGS. 5 and 7 in which the triac gates (25 in FIG. 5 and 25A in FIG. 7) are pulsed from the DC power storage element 13 when switch contacts 31 or 31B are closed. This fires the triac to provide a flow path for the discharge of DC from DC power source 13 through the load 45.

In the circuits of FIGS. 5 and 7, the switching means has dual contacts (31, 42 in FIG. 5 and 31B and 42 in FIG. 7). In the art, this is known as a Form C switch. One objective for the circuitry of FIGS. 8, 9 and 10 is to eliminate the need for a Form C switch and to perform all switching functions with a simple switch having a single contact. This is of particular importance when the controller of the present invention is sold for installation by the purchaser on other apparatus. The purchaser usually prefers a single contact switch, thus to provide a more conventional and simpler installation procedure.

Accordingly, in the modifications of FIGS. 8, 9 and 10, there is but a single switch contact in the switching mechanism. The dual switch contactor, such as 31 in FIG. 5 and 31B in FIG. 7, is eliminated.

In the circuits of FIGS. 8 and 9, the triac 14 or 14A is still pulsed when single contact switch 42 is opened. However, in these embodiments the voltage for the gate of the triac is no longer derived from the direct current power source 13. Instead, gate triggering voltage comes directly from the main AC source 10. For this purpose the polarity of triacs 14 and 14A in FIGS. 8 and 9 is reversed as compared to the polarity of such triacs in FIGS. 5 and 7. In FIGS. 8 and 9 gates 25, 25A are connected by a line 60 to a terminal 61 which is on the line side or ahead of triac 34. There is no switch such as 31 or 31B in line 60.

A current limiting resistor 62 is desirably added in line 60 in FIG. 8 in order to cut down the voltage applied to the triac gate 25 when switch 42 opens.

In the embodiments of FIGS. 8 and 9, as long as switch 42 is closed, thus to energize triac 34, there is no significant voltage drop across triac 34. Accordingly, gates 25, 25A cannot derive voltage from across the terminals 16, 61.

In the circuit of FIG. 9, DC power source 13 is charged through the diode 52, just as in FIG. 7. Diode 52 gets its charging voltage from source 10 via terminals 16, 18 which are across the load 45. Substantially the same is true in FIG. 8 in which diode 27 is energized by the voltage across terminals 16, 18, and pulses the gate 25 of triac 14 as a half-wave rectifier.

In the modified embodiments of FIGS. 8 and 9, when switch 42 is opened, the triac gates 25, 25A will receive a voltage pulse from source 10 across terminals 61, 16. The impedance of load 45 is very low so that substantially the full voltage of source 10 is imposed on terminals 61, 16 when triac 34 is non-conducting.

This immediately triggers triacs 14, 14A into conduction for discharge into the load 45 of direct current derived from DC power source 13. The voltage pulse on gate 25 of triac 14 is limited by resistor 62 in FIG. 8, and the voltage on gate 25A of SCR 53 of triac 14A is limited by the resistor 26A in FIG. 9.

In both of the circuits of FIGS. 8 and 9 there is a fail-safe relay F.S.R. numbered 64 in these figures. These relays are respectively energized by the F.S.R. relay coil 65 which is across the AC line 10. If the voltage from source 10 fails, relay coil 65 will be de-energized, thus closing the contacts of relay 64 and imposing the voltage of the DC power source 13 between the anode and gate of triacs 14, 14A, thus to fire the triac to discharge the DC power source 13 into the load 45 for braking purposes.

Such a fail-safe relay is not needed in the original circuitry of FIGS. 5 and 7, for example, because switch contacts 31 and 31B of the form C switches in these figures are typically spring or gravity biased toward their closed positions. Accordingly, if there is a power failure in the circuitry of FIGS. 5 and 7, switch contacts 31, 31B will automatically close to trigger the triac gate and impose braking current on the load 45. In the modifications of FIGS. 8 and 9, when the Form C switch is eliminated, the fail-safe relay is added to substitute for the automatically closing contacts 31, 31B in the event of a power failure.

The fail-safe relay is subject to only very infrequent service. Accordingly, it need not be as expensive or rugged as the contactors 31, 31B which are eliminated.

FIG. 10 shows a still further modification similar to that shown in FIG. 9 in which the triac 14A consists of a diode 52 and SCR 53 connected in inverse parallel and in which the gate 25A of SCR 53 is connected through resistor 26A through line 60 to terminal 61. In this embodiment there is no triac 34, and a simple switch 32 is substituted, as suggested in FIG. 1.

With switch 32 closed, AC power is supplied to load 45. AC power is rectified by diode 52 of triac 14A, and DC is stored in the DC power storage element 13. SCR 53 does not conduct because switch 32 connects gate 25A to the cathode of SCR 53 through trigger resistance 26A.

When switch 32 opens, AC power is removed from load 45 and from the rectifying circuit. AC now flows through trigger resistance 26A to triac gate 25A, via load 45. Trigger resistance 26A is high enough to limit the current through load 45 (for example, a motor winding) to a low enough value insufficient to run the motor, but sufficient to fire SCR 53, thus to impose braking DC and DC power source 13 on load 45.

Resistor 21 limits the current flow through diode 52 during the rectifying and charging cycle and limits current flow through the SCR 53 during the braking cycle. This limitation keeps current flow within the ratings of the semi-conductor devices.

Figure 11:
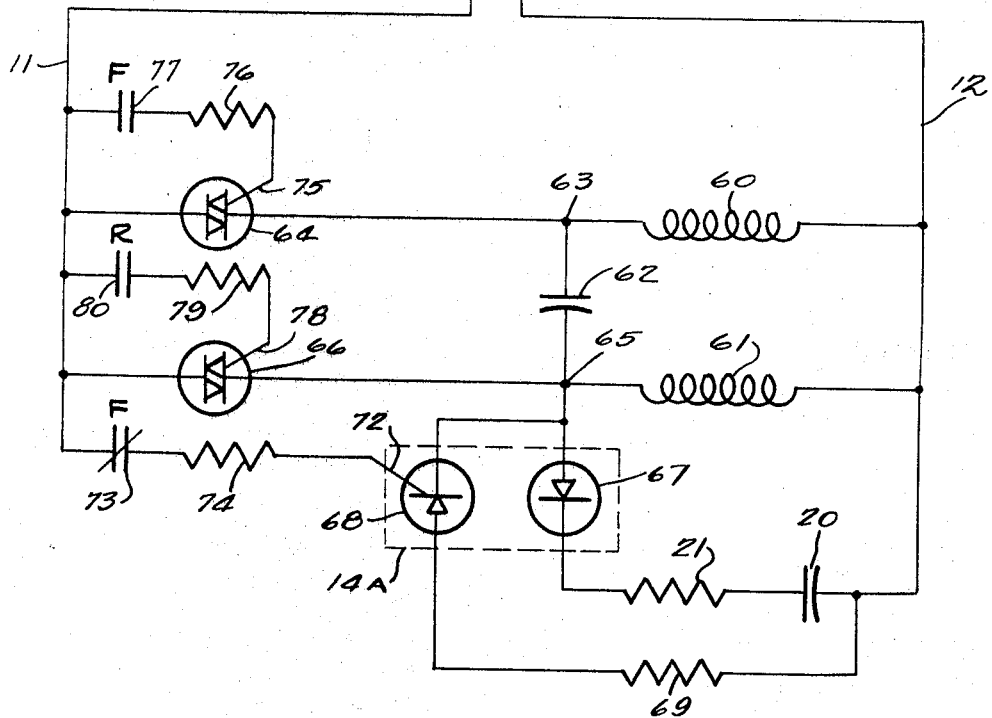
FIG. 11 is a circuit diagram showing a modified embodiment of the circuit of FIG. 6 in which the motor has forward and reverse windings and in which Triacs are used as control elements.
Figure 12:
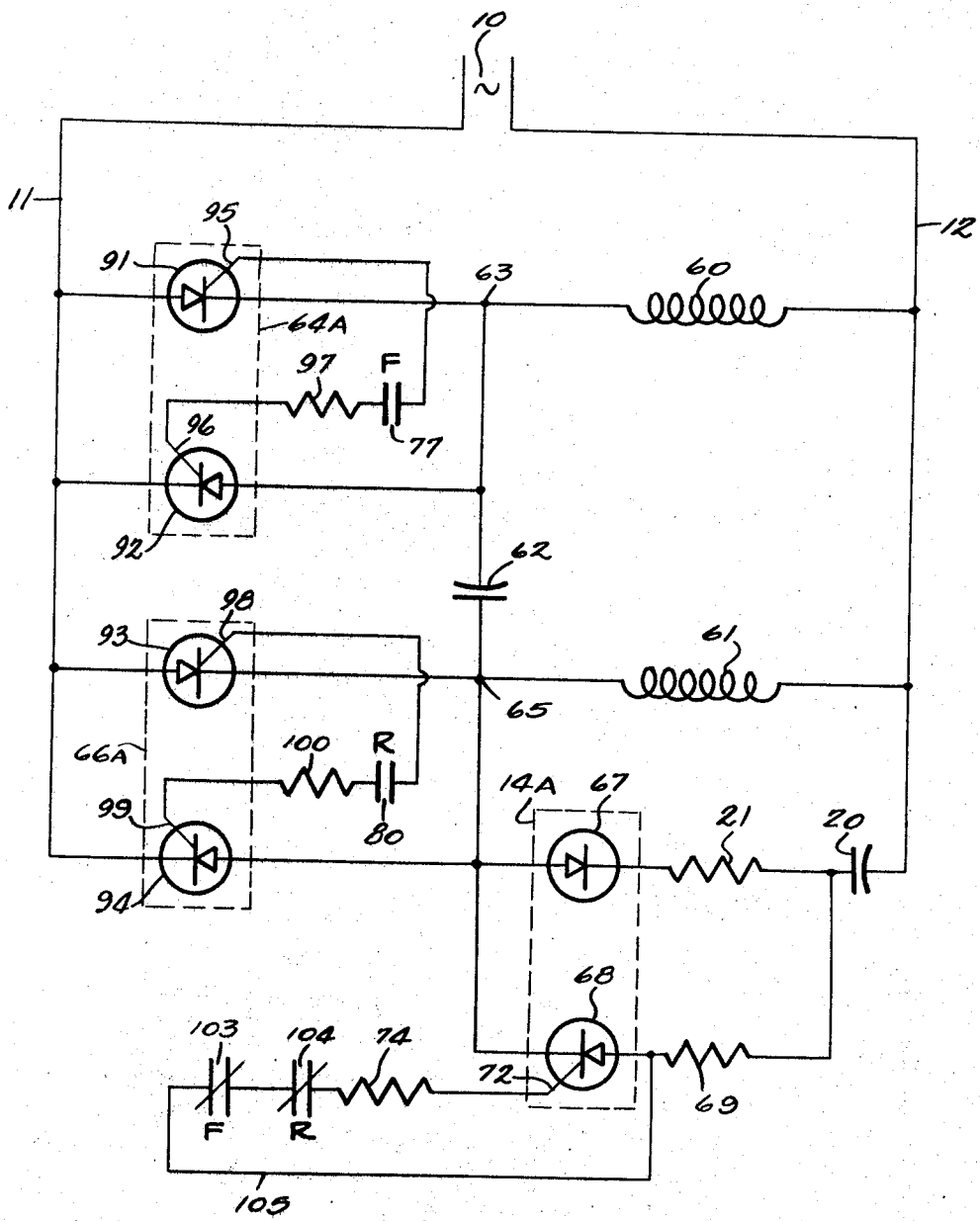
FIG. 12 is a circuit diagram showing a still further modified embodiment of the circuit of FIG. 6 in which the Triacs of FIG. 11 are replaced by paired SCR's connected in inverse parallel.

The circuits of FIGS. 11 and 12 are similar to the circuit shown in FIG. 6 in that the circuit is utilized to control dynamic braking of a motor having forward and reverse windings. In the circuit of FIG. 6 the braking direct current flowing through whichever one of the motor windings 45A, 45B is connected in the circuit by reason of the appropriate energization of the respective triacs 35A, 35B, also flows through one of triacs 35A, 35B. The braking current is typically considerably higher than the motor running current which flows through triacs 35A and 35B. Accordingly, triacs 35A, 35B are subject to relatively heavy current flow during the braking mode. This may result in overloading the triacs when the circuit of FIG. 6 is utilized to control dynamic braking of a relatively large electric motor which requires large braking current flow.

The circuit of FIG. 11 operates on principles very similar to those of the circuit of FIG. 6, except that the triacs 64, 66 which control the circuit are not in the braking current discharge circuit and hence are not subject to heavy loads aforesaid. Moreover, in the circuit of FIG. 11, all dynamic braking of the motor is effectuated by supplying DC to the same one of the two motor windings. This is unlike the circuit of FIG. 6 in which braking DC is imposed on whichever winding 45A, 45B is in the circuit at the time.

The motor of FIG. 11 circuit has a forward winding 60 and a reverse winding 61 with a phase displacing capacitor 62 interconnecting corresponding ends of the windings 60, 61. This arrangement is known as a split phase motor. Both windings 60, 61 are carried on a common frame, and the capacitor 62 conducts AC in both directions. Between terminal 63 and line 11 there is a control triac 64. Between terminal 65 and line 11 there is a control triac 66.

The DC power storage capacitor 20 is connected between line 12 and terminal 65 in series with a current limiting resistor 21 and a DC charging diode 67. A dynamic braking current discharge control SCR 68 is also connected to terminal 65 and through limiting resistor 69 to one side of the DC power storage capacitor 20. SCR 68 and diode 67 can be regarded as connected in inverse parallel and to constitute a triac network 14A.

The gate 72 of SCR 68 is controlled by forward contactor 73 connected between line 11 and gate 72 through resistor 74.

Triac 64 has its gate 75 connected through resistor 76, and forward contactor 77 to the line 11. Triac 66 has its gate 78 connected through resistor 79 and reverse contactor 80 to the line 11.

Figure 13:
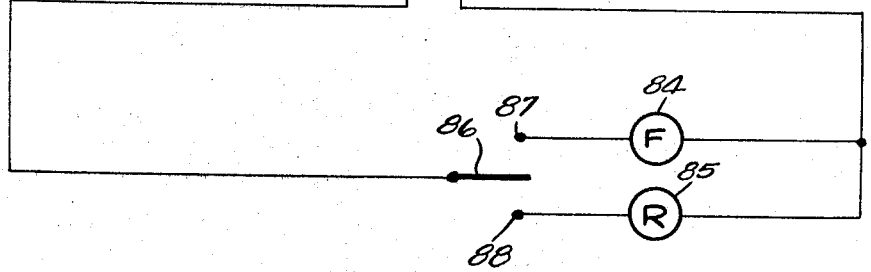
FIG. 13 is a circuit diagram of a low voltage control circuit for the circuits of FIGS. 11 and 12.

Switching is controlled by a low voltage control relay circuit shown in FIG. 13 in which a 24 volt AC supply 83 is selectively connected to a forward relay coil 84 and reverse relay coil 85 through a control switch 86.

The operation of the circuits FIGS. 11 and 13 is as follows. When the motor is to be run in the forward direction, switch 86 is turned to engage forward switch blade terminal 87. This energizes forward relay coil 84, thus to close forward contact 77 and energize the gate 75 of triac 64 and turn on the triac. AC is now supplied to the forward motor winding 60 to run the motor in the forward direction. At the same time, reverse relay coil 85 in FIG. 13 is de-energized, thus to open the contact 80 which controls the gate 78 of triac 66. Triac 66 is turned off so that no current will flow through triac 66 to the reverse motor winding 61.

Alternating current will be supplied to the reverse winding 61 through the capacitor 62. However, capacitor 62 will shift the phase of alternating current through almost 90 degrees. This will cause the motor to run in its forward direction.

While the motor is running in forward direction as aforesaid, the AC imposed between terminal 65 and line 12 will be rectified through diode 67 to charge the DC power storage capacitor 20. SCR 68 will be turned off because the normally closed contactor 73 in its gate circuit 72 will be opened under the influence of energization of the forward relay coil 84.

If the control switch 86 in FIG. 13 is now moved to a neutral position, as therein shown, relay coil 84 will be deenergized. This will allow spring biased contacts in the contactor 77 to open, thus to turn off the triac 64 and discontinue energization of the motor windings 60, 61 with AC. At the same time, normally closed contact 73 will close to energize the gate 72 of SCR 68 and turn on the SCR 68 and provide a flow path for direct current from capacitor 20 into the winding 61 of the motor (through terminal 65), and thus dynamically brake the motor. This dynamic braking direct current is kept out of forward winding 60 by capacitor 62. Moreover, this braking current, which is relatively high compared to the running current of the motor, does not flow through the triac 66.

When switch 86 is turned to engage reverse terminal blade 88, reverse relay coil 85 will be energized, thus to close contactor 80 in the circuit to gate 78 of triac 66. This provides a flow path through triac 66 for alternating current to the reverse winding 61 of the motor and, at the same time, short circuits the gate 72 of SCR 68 to result in turning off SCR 68 and discontinuing flow of direct current through SCR 68 from capacitor 20. Alternating current will also be imposed through capacitor 62 on the forward winding 60 of the motor. However, this current will be almost 90 degrees out of phase with the current flowing through the reverse winding 61. This will cause the motor to run in its reverse direction.

To dynamically brake the motor from its reverse running condition, switch 86 is returned to its neutral position, whereupon triac 66 is turned off as a result of the opening of contacts 80 in its gate circuit, thus to open the AC circuits to reverse winding 61 and remove the short circuit from the gate 72 of SCR 68. SCR 68 will now turn on because the circuit to its gate 72 is closed through contactor 73. Capacitor 20 will discharge through SCR 68 into the reverse winding 61 and dynamically brake the motor.

Accordingly, regardless of the direction in which the motor is run, it will be dynamically braked by energizing reverse winding 61 with direct current from the capacitor 20. Moreover, the braking current will not flow through either triac 64, 66, but only through the SCR 68. For this purpose SCR 68 will have a higher current carrying capacity than the triacs 64, 66.

The circuit of FIG. 12 illustrates how the triacs 64, 66 of the circuit of FIG. 13 can be replaced by paired SCR's connected in inverse parallel. In this circuit two SCR's 91, 92 together constitute a network equivalent to triac 64 of FIG. 11 and will be denominated as a triac network 64A. The two SCR's 93, 94 constitute the equivalent of triac 66 and will be denominated as a triac network 66A. As in the circuit of FIG. 11, the triac network 64A controls forward motor winding 60, and triac network 66A controls reverse motor winding 61, there being a phase displacing capacitor 62 therebetween.

Forward contactor 77 is connected between the respective gates 95, 96 of SCR's 91, 92 in series with resistor 97.

Reverse contactor 80 is connected between the respective gates 98, 99 of SCR's 93, 94 in series with resistor 100.

The DC power sortage capacitor 20 is charged through a diode 67 which has the same equivalent place in the circuit as diode 67 in FIG. 11. Capacitor 20 is discharged into the reverse motor winding 61 through SCR 68 which has the same equivalent place in the circuit as SCR 68 of FIG. 11. Diode 67 and SCR 68 may be regarded as a triac network 14A. SCR 68 has its gate 72 connected through resistor 74 in series with normally closed forward contactor 103 and reverse contactor 104 in a line 105 which is connected to capacitor 20 through resistor 69.

The switching control circuit shown in FIG. 13 is also used to control the circuit of FIG. 12.

When switch 86 of FIG. 13 is engaged with forward switch blade terminal 87, forward coil 84 is energized to close contact 77 in the gate circuit of triac 64A. This energizes the gate of the triac because a circuit is closed from line 11 through the cathode of SCR 92, gate 96, resistor 97, closed forward switch 77, gate 95 of SCR 91, cathode of SCR 91, through terminal 63 and the forward winding 60 of the motor to line 12. This turns on the triac 64A to energize the motor in forward direction. As in the circuit of FIG. 11, the motor reverse winding 61 is also energized through the split phase capacitor 62, but the current flow through the winding 61 is almost 90 degrees out of phase with that in winding 60.

While the triac 64A is thus turned on, triac 66A is turned off because contactor 80 is open.

As in the embodiment of FIG. 11, diode 67 in triac 14A charges DC power storage capacitor 20 while the motor runs in forward direction.

Dynamic braking of the motor is achieved from its forward running direction by moving the switch 86 to its mid or neutral position shown in FIG. 13. This opens the contactor 77 to turn off the triac 64A and discontinue supply of AC to the motor windings 60, 61. Both contactors 103 and 104 in the gate circuit of SCR 68 are now normally closed so that the gate 72 is supplied with DC voltage from the capacitor 20, thus turning on the SCR 68 to provide a discharge path for braking current into the reverse motor winding 61. Capacitor 62 keeps this direct current out of the forward winding 60.

When switch 86 in FIG. 13 is engaged with the reverse switch blade terminal 88, this will energize the reverse relay coil 85, thus to open contact 104 in the gate of SCR 68 to result in turning off the SCR 68 and discontinue discharge of braking current into the motor winding. At the same time, contacts 80 in the gate circuit of triac 66A will close to energize the gates 98, 99 in a circuit from line 11 through gate 99 of SCR 94, resistor 100, contactor 80, gate 98 of triac 93, terminal 65 and motor reverse winding 61 back to line 12. The motor will now run backward because of the energization of winding 61 and the phase displaced energization of forward winding 60 through capacitor 62. Capacitor 20 will be recharged through the diode 67.

When switch 86 is returned to its neutral position shown in FIG. 13, this will de-energize reverse relay coil 85 to permit reclosure of the contacts 104 in the gate circuit of SCR 68, thus triggering SCR 68 into conduction to discharge DC braking current from capacitor 20 into the reverse winding 61 to brake the motor.

I claim:

1. Apparatus for rectifying AC to DC and for controlling the imposition of DC on a load, said apparatus comprising an AC power source circuit, a rectifying circuit including a DC power storage element and a triac, and switching means for selectively connecting the rectifying circuit to the AC power source current or to the load to selectively charge the DC power storage element through said triac acting as a rectifier or impose its DC charge on the load through said triac acting as a conductor.

2. The apparatus of claim 1 in which the load comprises a winding of an AC motor, said switching means further comprising means to impose AC power on said winding to run the motor when the rectifying circuit is connected to the AC power source circuit and to disconnect the winding from said AC power source circuit when the winding is connected to the rectifying circuit for dynamic braking of the motor.

3. The apparatus of claim 1 in which the switching means includes means for controlling the energization of the gate of the triac.

4. The apparatus of claim 1 in which the switching means includes a diode in circuit with the triac gate and a switch to selectively bypass the diode.

5. The apparatus of claim 1 in which the DC power storage element comprises a capacitor.

6. The apparatus of claim 1 in which the DC power storage element comprises a battery.

7. The apparatus of claim 1 in which the switching means comprises another triac in the AC power source circuit and a switch in the gate circuit of said other triac.

8. The apparatus of claim 1 in which the switching means comprises another triac between the load and the AC source power circuit and a switch in the gate circuit of said other triac.

9. The apparatus of claim 2 in which said AC motor is reversible, said winding comprising a forward winding, said motor having a reverse winding, said switching means further comprising means to selectively connect at least one of said windings with the AC power circuit or with the rectifying circuit.

10. Apparatus for selectively imposing AC or DC upon a motor winding of an AC motor to selectively run the motor or to dynamically brake the motor, said apparatus comprising an AC power source circuit, a rectifying circuit including a DC power storage element and a triac, and switching means for selectively connecting the motor winding to the AC power source circuit for running the motor and simultaneously connecting the rectifying circuit to the AC power source circuit for concurrently charging up the DC power storage element through said triac acting as a rectifier, and disconnecting the AC power source circuit from said motor winding and concurrently connecting the DC power storage element to the winding through the triac acting as a conductor to impose the charge of the DC power storage element on the winding for the dynamic braking of the motor.

11. The device of claim 10 in which the switching means includes means for controlling the energization of the gate of the triac.

12. The device of claim 10 in which the switching means includes a diode in circuit with the triac gate and a switch to selectively bypass the diode.

13. The apparatus of claim 10 in which the switching means further comprises another triac in the AC power source circuit and a switch in the gate circuit of said other triac.

14. The device of claim 10 in which said motor also has a reverse winding, said switching means comprising means to selectively connect at least one of said windings to said AC source or to said DC power storage element through said triac.

15. The device of claim 14 in which the means last mentioned comprise triacs respectively in series with said motor windings and control means for the gates of said triacs whereby one or the other of said triacs conducts.

16. Apparatus for rectifying AC to DC and for controlling the imposition of DC on at least one of the forward and reverse windings of a reversible electric motor for the dynamic braking thereof, said apparatus comprising an AC power source circuit, a rectifying circuit including a DC power storage element and a triac, and switching means for selectively connecting the rectifier circuit through said triac acting as a rectifier to the AC power source circuit and through said triac acting as a conductor to at least one of the forward and reverse windings of the motor to impose the charge of the DC power storage element on said winding for the dynamic braking of the motor.

17. The apparatus of claim 16 in which said switching means comprises a triac in the circuit to the forward winding of the motor, a triac in the circuit to the reverse winding of the motor and control means for the gates of said triacs whereby one or the other of said triacs conducts.

18. The device of claim 16 in which said switching means comprises means to selectively energize one or the other of said forward and reverse windings with AC power concurrently with the connection of the AC power source circuit to the rectifying circuit during which the DC power storage element is charged.

19. The apparatus of claim 16 in which said switching means imposes the charge of the DC power storage element on one or the other of the forward and reverse windings.

20. The apparatus of claim 16 in which said switching means imposes the charge of the DC power storage element on only one of the forward and reverse windings.

21. The apparatus of claim 1 in which the gate of the triac is in a gate circuit energized by the DC power storage element when said switching means is actuated to connect the rectifying circuit to the load.

22. The apparatus of claim 1 in which the gate of the triac is in a gate circuit energized by the AC power source circuit when said switching means is actuated to connect the rectifying circuit to the load.

23. The apparatus of claim 1 in which the gate of the triac is in a gate circuit constantly connected to the AC power source circuit, said switching means comprising a switch in a load energizing circuit which bypasses the gate circuit when the load is energized and energizes the gate when the load is deenergized.

24. A dynamic braking circuit for an AC motor energized from an AC source, said circuit comprising a rectifying circuit about the motor and including a DC power storage element and a triac, and switching means for selectively:
 (a) connecting the motor to the AC power source and concurrently rectifying AC to DC through the triac acting as a rectifier to charge up the DC power storage element,
 (b) disconnecting the motor from the AC power source and concurrently discharging the DC power source through the triac acting as a conductor into the motor for dynamic braking of the motor.

25. The circuit of claim 24 in which the switching means comprises a connection from the gate of the triac to one side of the AC power source and a switch between said connection and the connection between the triac and the motor.

26. In a control circuit for a split phase AC motor having a forward winding, a reverse winding, and a phase shift capacitor, a rectifying and control circuit including a DC power storage element, a triac and switching means for selectively connecting the rectifier circuit through said triac acting as a rectifier to an AC power source to charge up the DC power storage element and through said triac acting as a conductor to one of the forward and reverse windings of the split phase motor to impose the charge of the DC power storage element on said winding for the dynamic braking of the motor.

27. The circuit of claim 26 in which there is a triac in the circuit to the forward winding of the motor, a triac in the circuit to the reverse winding of the motor and control means for the gates of said triacs whereby one or the other of said triacs conducts, said triacs being out of the circuit through which DC braking current is imposed on said one winding.

References Cited

UNITED STATES PATENTS 3,293,445    12/1966    Levy _____ 307—66
3,341,758    10/1967    Plumpe _____ 318—212

ORIS L. RADER, *Primary Examiner.*

GENE RUBINSON, *Assistant Examiner.*

U.S. Cl. X.R.

307—26, 38, 75; 318—207, 212, 227; 320—5; 321—43